United States Patent [19]

Parker et al.

[11] 4,452,939
[45] Jun. 5, 1984

[54] PROCESS FOR THE PREPARATION OF HIGH MOLECULAR WEIGHT POLYMERIC ANTIDEGRADANTS

[75] Inventors: Dane K. Parker, Massillon; Donald J. Burlett, Akron, both of Ohio

[73] Assignee: The Goodyear Tire & Rubber Company, Akron, Ohio

[21] Appl. No.: 470,123

[22] Filed: Feb. 28, 1983

[51] Int. Cl.³ .............................. C08K 5/20; C08K 5/37
[52] U.S. Cl. ....................................... 524/551; 528/489
[58] Field of Search ............... 524/217, 551, 401, 375; 528/489

[56] References Cited

U.S. PATENT DOCUMENTS

| 2,119,957 | 6/1938 | Nealon | 528/489 |
|---|---|---|---|
| 2,406,319 | 8/1946 | Brooks et al. | 524/551 |
| 2,447,772 | 7/1948 | Rust et al. | 524/401 |
| 2,449,489 | 9/1948 | Larson | 524/551 |
| 2,760,884 | 8/1956 | Graf, Jr. | 524/375 |
| 2,996,468 | 8/1961 | Powers et al. | 524/375 |
| 3,282,939 | 11/1966 | Spivack et al. | 524/217 |
| 4,098,760 | 7/1978 | Cornell | 524/217 |
| 4,293,476 | 10/1981 | Moore et al. | 524/551 |

FOREIGN PATENT DOCUMENTS

| 138671 | 11/1979 | Fed. Rep. of Germany | 524/217 |
|---|---|---|---|
| 648852 | 1/1951 | United Kingdom | 528/489 |
| 1051072 | 12/1966 | United Kingdom | 528/489 |

*Primary Examiner*—Joseph L. Schofer
*Assistant Examiner*—N. Sarofim
*Attorney, Agent, or Firm*—D. O. Nickey

[57] ABSTRACT

There is disclosed a process for the modification of a chloromethylated latex wherein said latex contains a surfactant of a nonionic or ionic-type comprising contacting said latex with an aqueous alkali solution and an alkali ionizable molecule containing antidegradant properties at a reaction temperature below 100° C. and in the presence of a nitrogen atmosphere.

20 Claims, No Drawings

PROCESS FOR THE PREPARATION OF HIGH MOLECULAR WEIGHT POLYMERIC ANTIDEGRADANTS

PRIOR ART

It is well known that in most elastomers, it is important to incorporate antidegradant compounds in order to stabilize the elastomer against oxidation by air or certain oxidizing substances. One of the problems of antidegradant technology has been the physical loss of antidegradants from the elastomers, chiefly through volitilization and/or extraction. As a result of this problem, it has been necessary to utilize an antidegradant compound that apart from having good antidegradant activity, possesses good solubility in the formulations of the elastomer. Stemming from the specificity of the antidegradant it has further narrowed the industrial product made from the elastomer. The problem of selection of the antidegradant has been somewhat eliminated by development of higher molecular weight antidegradants. Several known antidegradants are available which have a molecular weight near 1,000.

There are several known methods by which chemical bonding of an antidegradant to an elastomer network has been accomplished. One is the direct reaction of an antidegradant, or an incipient antidegradant, with an elastomer and the other is incorporation of an antidegradant during formation of an elastomer. An example of the first method is the reaction of aromatic nitroso compounds with natural rubber. Another general method which has been used to chemically bind an antidegradant into an elastomer is incorporation of the antidegradant during formation of the elastomer. This has been done by using polymerizable antidegradants; that is compounds which contain both an antidegradant function and a polymerizable function.

SUMMARY OF THE INVENTION

The present invention provides an improvement in a process for the production of forming polymer bound antidegradants. The inventor has unexpectedly found that by modifying a halomethylated latex by reacting the latex with an aqueous alkaline solution and an alkali ionizable molecule containing antidegradant properties at a temperature not to exceed 100° C. and in the presence of a nitrogen atmosphere, one can achieve a high level of attachment of the antidegradant moiety onto the polymer. Another advantage of the present invention is a decrease in the amount of physical loss of antidegradants from the elastomer by volatilization and/or extraction.

DESCRIPTION OF THE PREFERRED EMBODIMENT

There is disclosed a process for the modification of a chloromethylated latex wherein said latex contains a surfactant of a nonionic or ionic-type comprising contacting said latex with an aqueous alkaline solution and an alkali ionizable molecule containing antidegradant properties at a reaction temperature below 100° C. and in the presence of a nitrogen atmosphere.

Also disclosed is a process for the modification of a halomethylated polymer latex wherein said latex comprises (a) 0 to 39.9 parts by weight of styrene, (b) 60 to 99.9 parts by weight of butadiene, (c) 0.1 to 40 parts by weight of a monomer having a vinyl group and a halobenzyl group, (d) a surfactant wherein said surfactant is of the nonionic or ionic-type; comprising contacting said latex with an aqueous alkaline solution and an alkali ionizable molecule containing antidegradant properties at a reaction temperature not to exceed 100° C. and in the presence of a nitrogen atmosphere.

The present invention is a process which is based on nucleophilic displacement usually of a halogen and is generally conducted by stirring two liquid phases; an organic phase containing the substrate polymer and a concentrated aqueous phase of the anion to be transferred all in the presence of a surfactant of a nonionic or ionic-type. A method for obtaining the desired halogen containing polymer substrate is by polymerizing a halogen containing monomer with other monomers or mixtures of monomers capable of homopolymerization, copolymerization or interpolymerization by free-radical mechanism. Such monomers include conjugated dienes containing four to six or up to for example ten carbon atoms. Examples of such monomers are 1,3-butadiene; 2-ethyl butadiene-1,3:2,3-dimethyl butadiene-1,3; isoprene, piperylene; 1,3-hexadienes; 1,3-decadienes; and vinylic monomers including styrene, $\alpha$-methyl styrene, isomers of divinylbenzene, and acrylonitrile.

The latices to be used for modification can be prepared using two different surfactant systems. The first system is of a nonionic type. Examples of such nonionic surfactants that can be used in the present invention are Igepal TM (nonylphenoxy poly(ethyleneoxy)ethanol), Alkaltronics TM (propoxylated polyethylene glycol), Pluronics TM (mixed condensates of ethylene and propylene oxides with propylene glycol) and Pogol TM (polyethylene glycol).

The second type of system is the ionic-type. Examples of ionic surfactants are the conventional fatty acid soaps.

A halomethylated polymer latex containing a surfactant of a nonionic or ionic-type is reacted with an aqueous alkaline solution and an alkali ionizable molecule containing antidegradant properties. Examples of the source of the alkali moiety useful in the present invention are aqueous solutions of sodium hydroxide, sodium carbonate, potassium hydroxide and potassium carbonate.

The temperature at which the reaction is carried out in the latex system should not exceed 100° C. with a temperature of from 50° to 70° C. being preferred.

It has been found that it is advantageous to exclude oxygen from the reactions with the halomethylated latex, however small amounts of oxygen, for example oxygen present as an impurity in commercial grade nitrogen can be used.

The alkali ionizable molecules containing antidegradant properties includes those antidegradants of the amine and the hindered phenolic classes. These known antidegradants are generally known by the term chain-breaking antioxidants, however, other antioxidants commonly known as peroxide-decomposing antioxidants, ultraviolet screening agents, triplet quenchers and metal deactivators are contemplated herein. Some examples of chain-breaking antioxidants are represented by the following formulas:

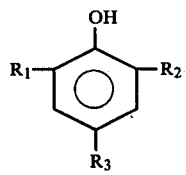

wherein $R_1$ and $R_2$ are the same or different radicals selected from the group consisting of hydrogen, alkyl, cycloalkyl, aralkyl or aryl and wherein $R_3$ is selected from

—SH

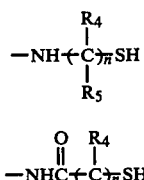

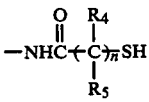

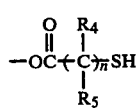

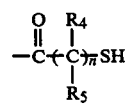

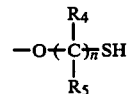

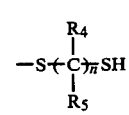

wherein $R_4$ and $R_5$ are both hydrogen and n equals 1–12 or $R_4$ is hydrogen, $R_5$ is a hydrocarbon radical having from 1 to 20 carbon atoms and n equals 1 or $R_4$ and $R_5$ are the same or different radicals selected from the group consisting of hydrocarbon radicals having 1 to 10 carbon atoms and n equals 1.

Other compounds useful in this invention:

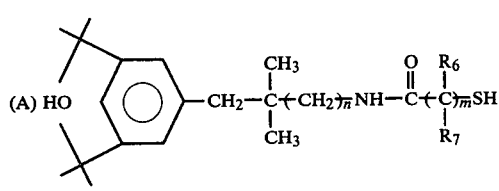

wherein n equals 0 or 1, $R_6$ and $R_7$ are both hydrogen and m equals 1 or $R_6$ is hydrogen, $R_7$ is a hydrocarbon radical having from 1 to 20 carbon atoms and m equals 1 or $R_6$ and $R_7$ are the same or different radicals selected from the group consisting of hydrocarbon radicals having 1 to 10 carbon atoms and m equals 1.

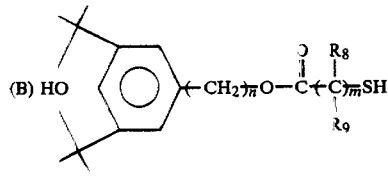

wherein m is equal to 1, $R_8$ and $R_9$ are both hydrogen and n equals 1–12 or $R_8$ is hydrogen, $R_9$ is a hydrocarbon radical having from 1 to 20 carbon atoms and n equals 1 or $R_4$ and $R_5$ are the same or different radicals selected from the group consisting of hydrocarbon radicals having 1 to 10 carbon atoms and n equals 1, and

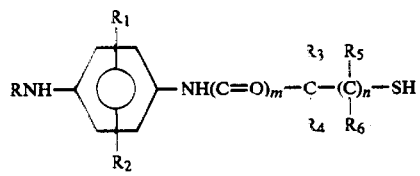

wherein m equals 0 to 1; $R_3$ and $R_4$ are the same radicals selected from the group consisting of hydrogen or alkyl radicals having 1 to 5 carbon atoms and n equals 0 or wherein $R_3$ and $R_4$ are hydrogen radicals and $R_5$ and $R_6$ are the same radicals selected from the group consisting of hydrogen or alkyl radicals having 1 to 5 carbon atoms and n equals 1; wherein $R_1$ and $R_2$ are the same or different radicals selected from the group consisting of hydrogen and alkyl radicals having 1 to 5 carbon atoms; wherein R is a radical selected from the group consisting of a cycloalkyl radical having from 5 to 12 carbon atoms, a branched acyclic group comprising a chain of 1 to 12 carbon atoms and each carbon may be substituted with 1 to 2 alkyl groups of 1 to 3 carbon atoms, an alicyclic aralkyl or aryl radical having from 7 to 14 carbon atoms, and a phenyl radical or phenyl radical which is substituted in any one or more positions with an alkyl or alkoxy group of 1 to 4 carbon atoms or with a radical of the formula

in which both $R_7$ and $R_8$ may be either a hydrogen radical or an alkyl radical of 1 to 4 carbon atoms; and

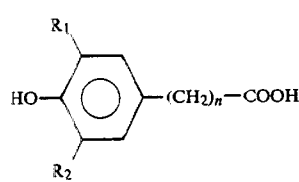

wherein n is equal to 0 to 12 and wherein $R_1$ and $R_2$ are the same or different radicals selected from the group comprising hydrogen, and hydrocarbon radicals having 1 to 18 carbon atoms; and

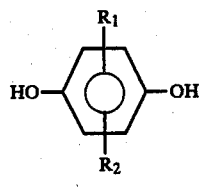
(VI)

wherein $R_1$ and $R_2$ are the same or different radicals selected from the group comprising hydrogen and hydrocarbon radicals having 1 to 18 carbon atoms; and

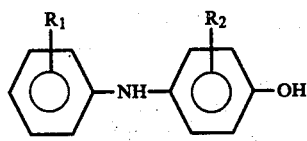
VII wherein $R_1$ and $R_2$ are the same or different radicals selected from the group comprising hydrogen and hydrocarbon radicals having 1 to 18 carbon atoms.

The amount of antidegradant which can be attached to a halomethylated latex is dependent upon the amount of pendent halomethyl groups and the amount of antidegradant charged. Preferably amounts from 0.1% to 45% by weight of antidegradants is bound to the latex. Most preferably amounts from 10% to 25%.

It should be understood that more than one antidegradant may be reacted together with the latex to give polymer bound antidegradants.

Latices prepared as per this invention containing high amounts of antidegradant, for example 10 to 40% by weight, may be used as a masterbatch for conventional latices.

All units of measurement shall refer to parts by weight unless specifically stated to the contrary.

The following examples are supplied in order to illustrate, but not necessarily to limit, the process of the present invention.

PREPARATION OF CHLOROMETHYLATED SBR LATEX USING NONIONIC SURFACTANT SYSTEM

Latices were prepared in four ounce bottles. To these four ounce bottles were charged 15 parts styrene, 75 parts butadiene, 10 parts vinylbenzyl chloride, 8 parts of nonylphenoxy poly(ethyleneoxy)ethanol (Igepal ™ CO-850), 0.4 parts sodium dihydrogen phosphate, 0.6 parts dodecyl mercaptan, 0.225 parts of an aqueous solution of sodium dimethyldithiocarbamate, and 0.03 parts of an aqueous solution of diethylhydroxylamine. The reactants were polymerized for 22 hours at 50° C. Conversions ranged from 96.2 to 97.6%. This chloromethylated SBR latex using nonionic surfactant Igepal ™ CO-850 shall hereinafter be referred to as latex A.

The above recipe was repeated in all respects with the exception of the deletion of 0.225 parts of an aqueous solution of sodium dimethyldithiocarbamate and 0.03 parts of an aqueous solution of diethylhydroxylamine (shortstop). This latex shall hereinafter be referred to as latex B.

The above recipe for latex A was repeated in all respects with the exception of the conversion was 65% instead of 96.2 to 97.6%. This latex shall hereinafter be referred to as latex C.

PREPARATION OF CHLOROMETHYLATED SBR LATEX USING IONIC SURFACTANT SYSTEM

To a 16 ounce bottle was charged 75 parts butadiene, 15 parts styrene, 10 parts vinylbenzyl chloride and a mixed rosin acid (potassium soap of dehydrogenated rosins and a hydrogenated mixed fatty acid) and paramenthane hydroperoxide as the initiator. The reactants were polymerized for 19 hours at 5° C. The latices were shortstopped with 0.045 parts of an aqueous solution of sodium dimethyldithiocarbamate and 0.006 parts of diethylhydroxylamine at approximately 62.5% conversion. This latex shall hereinafter be referred to as latex D.

The above recipe was repeated in all respects with the exception of the conversion was 55% instead of 62.5%. This latex shall hereinafter be referred to as latex E.

The latices A, B, C, D and E were then characterized with respect to pH, percent solids and the solubility of the coagulated rubber in methylene chloride. Chlorine content was determined by elemental analysis. The data collected are shown in Table I.

TABLE I

| | LATICE DATA | | | | |
|---|---|---|---|---|---|
| | A | B | C | D | E |
| Charge % styrene | 15 | 15 | 15 | 15 | 15 |
| Charge % butadiene | 75 | 75 | 75 | 75 | 75 |
| Charge % vinylbenzyl chloride | 10 | 10 | 10 | 10 | 10 |
| % solids | 35.2 | 36.0 | 35.0 | 22.2 | 23.5 |
| pH | 5-6 | 3 | 5-6 | 8-9 | 8-9 |
| % conversion | 97.6 | 96.2 | 65 | 62.5 | 55 |
| Reaction temp (°C.) | 50 | 50 | 50 | 5 | 5 |
| % Cl | 1.95 | 2.23 | 2.0 | 2.25 | 1.92 |
| Short stop | Yes | No | Yes | Yes | Yes |
| Surfactant system | Igepal CO-850 | Igepal CO-850 | Igepal CO-850 | Soap System | Soap System |

EXAMPLES 1–12

The latex sample was weighed into a glass vial and the desired amount of 2,6-di-t-butyl-4-mercapto-phenol and aqueous potassium hydroxide were added to the latex. The vial was purged with nitrogen, the mixture was shaken vigorously and was then placed in an oven at 60° C. for the desired length of time. The sample was then cooled, methanol was added to coagulate the polymer and the resulting sample was placed in a soxhlet extractor. The sample was then extracted with methanol for approximately 8 hours. The sample was dried under an aspirator vacuum for 18 hours. The sample was analyzed by infrared spectroscopy and submitted for elemental analysis. Table II list the latex modifications for the preceding examples.

EXAMPLES 13–15

The latex sample was weighed in a glass vial and the desired amount of 4 mercapto acetamido-diphenylamine and aqueous potassium hydroxide were added to the latex. The vial was purged with nitrogen, the mixture was shaken vigorously and was then placed in an oven at 60° C. for the desired length of time. The sample was then cooled, methanol was added to coagulate the polymer and the resulting sample was placed in a soxhlet extractor. The sample was then extracted with methanol for approximately 8 hours. The sample was dried under an aspirator vacuum for 18 hours. The sample was analyzed by infrared spectroscopy and submitted for elemental analysis. Table II list the latex modifications for the preceding examples.

EXAMPLES 16–17

The latex sample was weighed into a glass vial and the desired amount of 2,6-diphenyl-4 mercapto-phenol and aqueous potassium hydroxide were added to the latex. The vial was purged with nitrogen, the mixture was shaken vigorously and was then placed in an oven at 60° C. for the desired length of time. The sample was then cooled, methanol was added to coagulate the polymer and the resulting sample was placed in a soxhlet extractor. The sample was then extracted with methanol for approximately 8 hours. The sample was dried under an aspirator vacuum for 18 hours. The sample was analyzed by infrared spectroscopy and submitted for elemental analysis. Table II list the latex modifications for the preceding examples.

TABLE III

Below are listed the weight percent of antidegradant which is bound in the various prepared latices:

| Example | PHR ANTIDEGRADANT |
|---|---|
| 1 | 11.0 |
| 2 | 3.4 |
| 3 | 2.1 |
| 4 | 4.8 |
| 5 | 5.3 |
| 6 | 1 |
| 7 | 1.8 |
| 8 | 5.4 |
| 9 | 4.8 |
| 10 | 5.2 |
| 11 | 1.2 |
| 12 | 1 |
| 13 | .1 |
| 14 | 1.8 |
| 15 | 1.5 |
| 16 | 1.3 |
| 17 | .2 |

EXAMPLES 18–30

To evidence one advantage of the present invention, chloromethylated styrene butadiene latices modified with 2,6-di-t-butyl-4-mercapto-phenol, as per the invention were blended with conventional styrene butadiene latex containing 0.75 phr of Wingstay 100 TM hereinafter referred to as unmodified SBR latex. These blends were coagulated using either acid-alum, acid salt or alcohol. The resulting polymers were then extracted prior to testing and then tested for oxygen absorption.

The latices as prepared and blended listed below were coagulated by these following coagulation techniques.

TABLE II

LATEX MODIFICATIONS

| Example | Latex | Moles VBC* in Latex | Moles of Antidegradant | Moles KOH | Surf. System | Reaction Temp. (°C.) | Reaction Time (Hrs.) | Product % Cl | Product % S | % AD** Incorp. | % Cl Retain | IR Data |
|---|---|---|---|---|---|---|---|---|---|---|---|---|
| 1 | A | .00023 | .00084 | .00172 | Nonionic | 55 | 1.5 | .45 | 1.48 | 69 | 19 | Phenol —OH |
| 2 | A | .00023 | .00084 | .00172 | Nonionic | 75–80 | 2.0 | 0.29 | 1.81 | 84 | 12 | Phenol —OH |
| 3 | A | .00023 | .00084 | .00172 | Nonionic | 60 | 16 | .39 | 1.63 | 76 | 16 | Phenol —OH |
| 4 | A | .00023 | .00084 | .00086 | Nonionic | 60 | 18 | .08 | 2.00 | 97 | 3 | Phenol —OH |
| 5 | B | .00023 | .00084 | .00086 | Nonionic | 60 | 18 | .15 | 2.07 | 94 | 2 | Phenol —OH |
| 6 | B | .00023 | — | .00086 | Nonionic | 60 | 18 | 2.27 | .15 | 0 | 93 | No Phenol —OH |
| 7 | B | .00023 | .00084 | — | Nonionic | 60 | 18 | 2.23 | .38 | 16 | 34 | Small Phenol —OH |
| 8 | B | .00023 | .00084 | .00064 | Nonionic | 60 | 18 | .17 | 2.08 | 93 | * | Phenol —OH |
| 9 | B | .00023 | .00042 | .00032 | Nonionic | 60 | 18 | .37 | 2.00 | 86 | .4 | Phenol —OH |
| 10 | D | .00046 | .00126 | .00064 | Ionic | 60 | 18 | .29 | 2.05 | 89 | .1 | Phenol —OH |
| 11 | D | .00046 | .00126 | — | Ionic | 60 | 18 | 1.83 | .34 | 33 | 67 | Phenol —OH |
| 12 | D | .00046 | —0 | .00064 | Ionic | 60 | 18 | — | — | 0 | — | No Phenol |
| 13 | D | .0015 | .0045 | .0075 | Ionic | 60 | 22 | — | .14 | 26 | — | — |
| 14 | A | .0060 | .0060 | .0100 | Nonionic | 60 | 22 | — | .35 | 55 | — | — |
| 15 | C | .0060 | .0060 | .0100 | Nonionic | 60 | 22 | — | .31 | 50 | — | — |
| 16 | C | .0041 | .0041 | .0023 | Nonionic | 60 | 23 | — | .38 | 22 | — | — |
| 17 | E | .0046 | .0046 | .0023 | Ionic | 60 | 23 | — | .14 | 29 | — | — |

*Vinyl Benzyl Chloride
**Antidegradant

Acid-alum coagulation

A solution of 2 grams of aluminum potassium sulfate in 400 ml of water was heated to 60°–65° C. and the pH was adjusted to approximately 2.5 by addition of sulfuric acid. 50 ml of latex was added dropwise with stirring while maintaining the temperature of 60° C. After all the latex had been coagulated, the polymer was collected on a screen, washed with several volumes of water and was dried at room temperature.

Acid-salt coagulation

To approximately 100 ml of latex, 8.25 g of sodium chloride was added with stirring. Dilute sulfuric acid was added to the thickened latex until the pH was adjusted to 4 at which point the latex coagulated. The polymer was collected, washed and air dried.

Alcohol coagulation

To approximately 3000 ml of isopropyl alcohol was added, dropwise with stirring, 300 ml of latex. The coagulated polymer was collected, washed and air dried.

Extraction and oxygen absorption testing

All samples were cut into thin strips, placed in a thimble in a soxhlet extractor and extracted for 24 hours with methanol. The samples were removed, dried and tested at 100° C. until 1% by weight of oxygen had been absorbed.

The testing procedure is described in *Industrial and Engineering Chemistry*, Vol. 43, Page 456 (1951)

EXAMPLE 18

To a solution of 51.8 grams of a chloromethylated latex which had a monomer charge ratio of 75/15/10 butadiene/styrene/vinyl benzyl chloride and containing a nonionic surfactant (Igepal TM) was added 12.8 milliliters of 1.72 N potassium hydroxide solution, and 10.5 grams of 2,6-di-t-butyl-4-mercapto-phenol. The resulting latex was placed in an oven at 60° C. under a nitrogen atmosphere for 18 hours. This latex had 22 phr of 2,6-di-t-butyl-4-mercapto-phenol.

To 20 milliters of this modified latex was added 480 milliliters of unmodified latex having a charge ratio of 73.5/23.5 butadiene/styrene.

The blended latex was rolled for approximately 1 hour then coagulated using the alcohol coagulation discussed above.

EXAMPLE 19

To a solution of 45.7 grams of a chloromethylated latex which had a monomer charge ratio of 75/15/10 butadiene/styrene/vinyl benzyl chloride and containing Igepal TM was added 11.5 milliliters of 1.72 N potassium hydroxide solution and 9.4 grams of 2,6-di-t-butyl-4-mercapto-phenol. The resulting latex was placed in an oven at 60° C. under a nitrogen atmosphere for 18 hours. This latex had 17 phr of 2,6-di-t-butyl-4-mercapto-phenol. To 20 milliliters of this modified latex was added 480 milliliters the unmodified SBR (73.5/25.5) latex. The blended latex was rolled for approximately 1 hour then coagulated using the alcohol coagulation discussed above.

EXAMPLE 20

To a solution of 51.1 grams of a chloromethylated latex which had a monomer charge ratio of 75/15/10 butadiene/styrene/vinyl benzyl/chloride and containing an ionic surfactant (potassium soap of dehydrogenated rosins and a hydrogenated mixed fatty acid) was added to 7.8 milliliters of 1.72 N potassium hydroxide solution and 6.40 grams of 2,6-di-t-butyl-4-mercapto-phenol. The resulting latex was placed in an oven at 60° C. under a nitrogen atmosphere for 18 hours. This latex had 16 phr of 2,6-di-t-butyl-4-mercapto-phenol. To 20 milliliters of this modified latex was added 480 milliliters of unmodified SBR latex (73.5/26.5). The blended latex was rolled for approximately one hour then coagulated using the alcohol coagulation discussed above.

EXAMPLE 21

To 20 milliliters of the modified latex of Example 14 (containing 17 phr of 2,6-di-t-butyl-4-mercapto-phenol) was added 480 milliliters of unmodified SBR latex (73.5/26.5). The blended latex was rolled for approximately one hour and then coagulated using the alcohol coagulation discussed above.

EXAMPLE 22

To 20 milliliters of the modified latex of Example 14 (containing 17 phr of 2,6-di-t-butyl-4-mercapto-phenol) was added 480 milliliters of unmodified SBR latex (73.5/26.5). The blended latex was rolled for approximately one hour and then coagulted using the acid salt coagulation discussed above.

EXAMPLE 23

To 20 milliliters of the modified latex of Example 13 (containing 22 phr of 2,6-di-t-butyl-4-mercapto-phenol) was added 480 milliliters of unmodified SBR latex (73.5/26.5). The blended latex was rolled for approximately one hour and then coagulated using the alcohol coagulation discussed above.

EXAMPLE 24

To 20 milliliters of the modified latex of Example 13 (containing 22 phr of 2,6-di-t-butyl-4-mercapto-phenol) was added 480 milliliters of unmodified SBR latex (73.5/26.5). The blended latex was rolled for approximately one hour and then coagulated using the acid salt coagulation discussed above.

EXAMPLE 25

To 20 milliliters of the modified latex of Example 15 (containing 16 phr of 2,6-di-t-butyl-4-mercapto-phenol) was added 480 milliliters of unmodified SBR latex (73.5/26.5). The blended latex was rolled for approximately one hour then coagulated using the alcohol coagulation discussed above.

EXAMPLE 26

To 20 milliliters of the modified latex of Example 15 (containing 16 phr of 2,6-di-t-butyl-4-mercapto-phenol) was added 480 milliliters of unmodified SBR latex (73.5/26.5). The blended latex was rolled for approximately 1 hour and then coagulated using the acid salt coagulation discussed above.

EXAMPLE 27

To 20 milliliters of the modified latex of Example 14 (containing 17 phr of 2,6-di-t-butyl-4-mercapto-phenol) was added 480 milliliters of unmodified SBR latex (73.5/26.5). The blended latex was rolled for approximately 1 hour and then coagulated using the alcohol coagulation discussed above.

EXAMPLE 28

To 10 milliliters of the modified latex of Example 14 (containing 17 phr of 2,6-di-t-butyl-4-mercapto-phenol) was added 120 milliliters of unmodified SBR latex (73.5/26.5). The latex was rolled for 30 minutes and then coagulated using the Acid Alum technique discussed above.

EXAMPLE 29

To 10 milliliters of the modified latex of Example 13 (containing 22 phr of 2,6-di-t-butyl-4-mercapto-phenol) was added 120 milliliters of unmodified SBR latex (73.5/26.5). The latex was rolled for 30 minutes and then coagulated using the Acid Alum technique discussed above.

EXAMPLE 30

To 10 milliliters of the modified latex of Example 15 (containing 16 phr of 2,6-di-t-butyl-4-mercapto-phenol) was added 120 milliliters of unmodified SBR latex (73.5/26.5). The latex was rolled for 30 minutes and then coagulated using the Acid Alum technique discussed above.

EXAMPLE 31

To 50 grams of an unmodified chloromethylated SBR latex (with a charge ratio of 75/24/1 butadiene/styrene/vinyl benzyl chloride) with Igepal TM as a surfactant was added 1.09 grams of 2,6-di-t-butyl-4-mercapto-phenol and 1.33 milliliters of 1.72 N potassium hydroxide. The resulting latex was heated in an oven at 60° C. under nitrogen for approximately 18 hours. The latex was then coagulated with isopropyl alcohol, placed in a soxhlet extractor for 24 hours with methyl alcohol. The sample was then dried at room temperature for 48 hours.

EXAMPLE 32

To 50 grams of unmodified chloromethylated SBR latex (with a charge ratio of 75/24/1 butadiene/styrene/vinyl benzyl chloride) with an ionic surfactant (potassium soap of the dehydrogenated rosins and a hydrogenated mixed fatty acid) was added 1.09 grams of 2,6-di-t-butyl-4-mercapto-phenol and 1.33 milliliters of 1.72 N potassium hydroxide. The resulting latex was heated at 60° C. under nitrogen for approximately 18 hours. The latex was then coagulated with isopropyl alcohol, placed in a soxhlet extractor for 24 hours with methyl alcohol.

EXAMPLE 33

To 50 grams of unmodified chloromethylated SBR latex (with a charge ratio of 75/24/1 butadiene/styrene/vinyl benzyl chloride) with an ionic surfactant (potassium soap of the dehydrogenated rosins and a hydrogenated mixed fatty acid) was added 1.09 grams of 2,6-di-t-butyl-4-mercapto-phenol and 1.33 milliliters of 1.72 N potassium hydroxide. The resulting latex was heated at 60° C. under nitrogen for approximately 18 hours. To one-half of the above latex was added 2 grams of alum in 400 milliliters of water thereafter the pH was adjusted to 2.5 with sulfuric acid. The sample was washed with water and dried overnight.

EXAMPLE 34

To the other half of the above latex from Example 28 was added 2.1 grams of NaCl and diluted with sulfuric acid. The sample was washed with water and dried overnight.

EXAMPLES 35-36

To 50 grams of unmodified chloromethylated SBR latex (with a charge ratio of 75/24/1 butadiene/styrene/vinyl benzyl chloride) with Igepal TM as a surfactant was added 1.09 grams of 2,6-di-t-butyl-4-mercapto-phenol and 1.33 milliliters of 1.72 N potassium hydroxide. The resulting latex was heated at 60° C. under nitrogen for approximately 18 hours.

To one-half of the above latex was added 2 grams of alum in 400 milliliters of water, thereafter the pH was adjusted to 2.5 with sulfuric acid. The latex did not coagulate.

To the other one-half of the above latex was added 2.1 grams of NaCl and diluted with sulfuric acid. The latex did not coagulate.

Tables IV, V and VI lists information pertaining to the polymers prepared in Examples 13-31:

TABLE IV
Alcohol Coagulation

| Example | Surfactant | Conversion | Blend | PHR AD | Oxygen Absorption Hours |
|---|---|---|---|---|---|
| 18 | Nonionic | Low | Yes | 1.5 | 510 |
| 19 | Nonionic | High | Yes | 1.5 | 540 |
| 20 | Ionic | Low | Yes | 1.1 | 395 |
| 21 | Nonionic | High | Yes | 1.4 | 515 |
| 23 | Nonionic | Low | Yes | 1.2 | 370 |
| 25 | Ionic | Low | Yes | 1.0 | 340 |
| 27 | Nonionic | High | Yes | 1.4 | — |
| 31 | Nonionic | Low | No | 1.7 | 200 |
| 32 | Ionic | Low | No | 1.7 | 240 |

TABLE V
Acid-Salt Coagulation

| Example | Surfactant | Conversion | Blend | PHR AD | Oxygen Absorption Hours |
|---|---|---|---|---|---|
| 22 | Nonionic | High | Yes | 1.6 | 270 |
| 24 | Nonionic | Low | Yes | .7 | 80 |
| 26 | Ionic | Low | Yes | .8 | 80 |
| 34 | Ionic | High | No | 2.0 | 195 |
| 36 | Nonionic | — | No | — | — |

TABLE VI
Acid Alum Coagulation

| Example | Surfactant | Conversion | Blend | PHR AD | Oxygen Absorption Hours |
|---|---|---|---|---|---|
| 28 | Nonionic | High | Yes | 1.8 | 475 |
| 29 | Nonionic | Low | Yes | 1.3 | 430 |
| 30 | Ionic | Low | Yes | 1.3 | 175 |
| 33 | Ionic | | No | 1.8 | 85 |
| 35 | Nonionic | — | No | — | — |

We claim:

1. A process for the modification of a halomethylated polymer latex wherein said latex comprises
   (a) 0 to 39.9 parts by weight of styrene,
   (b) 60 to 99.9 parts by weight of butadiene,
   (c) 0.1 to 40 parts by weight of vinylbenzyl chloride,
   (d) a surfactant wherein said surfactant is of the nonionic or ionic-type;
   comprising contacting said latex with an aqueous alkaline solution and an alkali ionizable molecule containing antidegradant properties selected from the group consisting of chain-breaking antidegradants, peroxide decomposing antidegradants, ultraviolet screening antidegradants, triplet quenching antidegradants and metal deactivation antidegradants at a reaction temperature not to exceed 100° C. and in the presence of a nitrogen atmosphere.

2. The process of claim 1 wherein said alkali ionizable molecule containing antidegradant properties is a chain-breaking antioxidant.

3. The process of claim 2 wherein said chain-breaking antioxidant is 2,6-di-t-butyl-mercaptophenol.

4. The process of claim 2 wherein said chain-breaking antioxidant is 4 mercaptoacetamido diphenylamine.

5. The process of claim 2 wherein said chain breaking antioxidant is 4 mercaptophenol.

6. The process of claim 2 wherein said chain-breaking antioxidant is 4 mercaptopropionamido diphenylamine.

7. The process of claim 3 wherein said nonionic surfactant is nonylphenoxy poly(ethyleneoxy) ethanol.

8. A process for the modification of an elastomeric latex composition which contains from 0.1 to 40 parts by weight vinylbenzyl chloride and a surfactant of a non-ionic or ionic type, said process comprising contacting said latex with an aqueous alkali solution and an alkali ionizable molecule containing antidegradant properties selected from the group consisting of chain-breaking antidegradants, peroxide decomposing antidegradants, ultraviolet screening antidegradants, triplet quenching antidegradants and metal de-activation antidegradants at a temperature below 100° C. and in the presence of a nitrogen atmosphere.

9. The process of claim 8 wherein said aqueous alkaline solution is aqueous sodium hydroxide.

10. The process of claim 8 wherein said aqueous alkaline solution is aqueous potassium hydroxide.

11. The process of claim 8 wherein said reaction temperature is from 50° to 70° C.

12. A polymeric latex prepared by a process comprising the steps of contacting a elastomeric latex composition which contains from 0.1 to 40 parts by weight vinylbenzyl chloride polymer latex wherein said latex comprises
  (1) 0 to 39.9 parts by weight of styrene,
  (2) 60 to 99.9 parts by weight of butadiene,
  (3) 0.1 to 40 parts by weight of a monomer having a vinyl group and a chloro-benzyl group,
  (4) a surfactant wherein said surfactant is of the non-ionic or ionic type;
with an aqueous alkaline solution and an alkali ionizable molecule containing antidegradant properties at a temperature not to exceed 100° C. and in the presence of a nitrogen atmosphere.

13. The latex of claim 12 wherein said alkali ionizable molecule containing antidegradant properties is a chain-breaking antidegradant.

14. The latex of claim 13 wherein said chain-breaking antioxidant is 2,6-di-t-butyl-mercaptophenol.

15. The latex of claim 13 wherein said chain breaking antioxidant is 4 mercaptoacetamido diphenylamine.

16. The latex of claim 13 wherein said chain-breaking antioxidant is 4 mercaptophenol.

17. The latex of claim 13 wherein said chain-breaking antioxidant is 4 mercaptopropionamido diphenylamine.

18. The latex of claim 17 wherein said nonionic surfactant is nonylphenoxy poly(ethyleneoxy) ethanol.

19. The latex of claim 12 wherein said aqueous alkaline solution is aqueous sodium hydroxide.

20. The latex of claim 12 wherein said aqueous alkaline solution is aqueous potassium hydroxide.

* * * * *